UNITED STATES PATENT OFFICE.

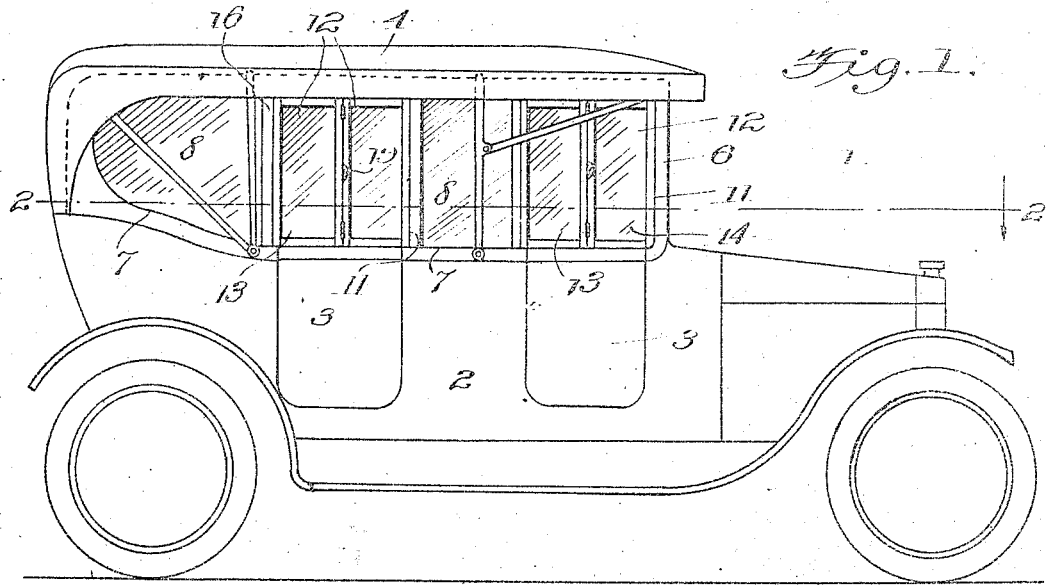
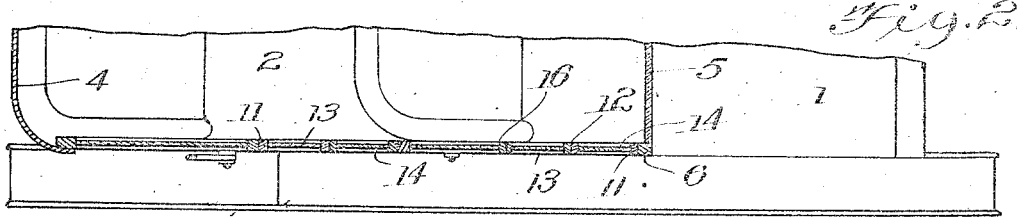
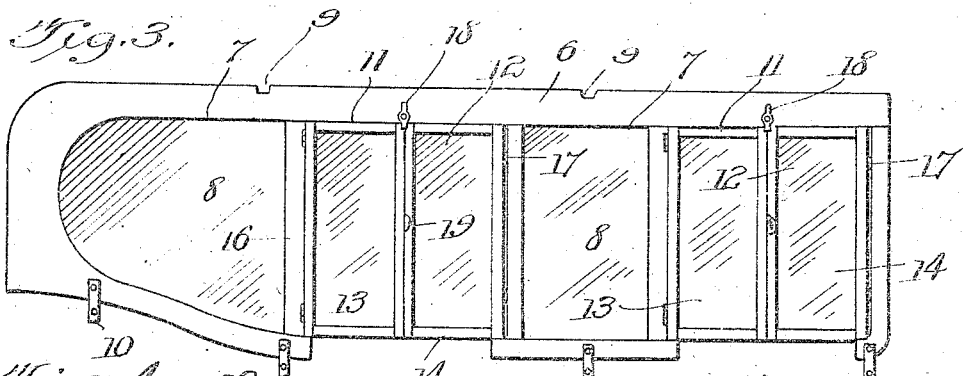
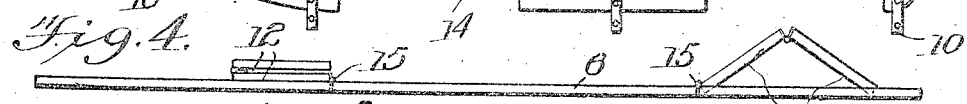
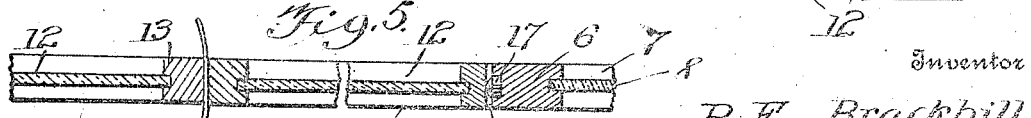

BENJAMIN FRANK BRACKBILL, OF PHILADELPHIA, PENNSYLVANIA.

VEHICLE-CLOSURE.

1,232,194. Specification of Letters Patent. Patented July 3, 1917.

Application filed January 4, 1916. Serial No. 70,179.

*To all whom it may concern:*

Be it known that I, BENJAMIN FRANK BRACKBILL, a citizen of the United States, residing at Philadelphia, in the county of Philadelphia and State of Pennsylvania, have invented new and useful Improvements in Vehicle-Closures, of which the following is a specification.

This invention relates to vehicle closures and an object of the invention is to provide a vehicle with an auxiliary body for inclosing the interior of the vehicle, to enable the same to be comfortably used in cold or inclement weather.

Another object is to provide an efficient structure for converting the usual "open" type of automobile into an inclosed form particularly designed for use in winter.

A further object resides in a vehicle attachment of the above character wherein hinged doors of novel construction are provided, for coöperation with the usual side doors of the vehicle; said doors being of a foldable design, easy to operate and of a formation to minimize the amount of space required for their operation.

Other objects will be in part obvious and in part pointed out hereinafter.

The invention accordingly consists in the features of construction, combination of elements and arrangement of parts which will be exemplified in the construction herein described, and the scope of the application of which will be indicated in the following claims.

In the accompanying drawings, wherein is shown a preferred embodiment of the invention, Figure 1 is a side elevation of an automobile illustrating the application of the vehicle closure comprising the present invention;

Fig. 2 is a horizontal sectional view taken through the same;

Fig. 3 is an enlarged side elevation of one of the frame members, and

Figs. 4 and 5 are detail sectional views thereof.

Similar reference characters refer to similar parts throughout the several views of the drawings.

This invention is applicable to any type of vehicle, but, for purposes of illustration, it has been shown as applied to a standard form of automobile 1, the latter comprising the usual body 2, side doors 3, flexible tops 4 and a wind-shield 5, all of which are of the usual construction and therefore do not require a detailed description.

In order to inclose the body of the automobile and render the same comfortable for use in inclement seasons, there is provided frames 6, preferably formed with rigidly connected sections and of suitable relatively light weight material. The frames are provided with rectilinear openings 7 in which are firmly positioned transparent window panes 8, for obvious purposes. The frames are adapted to be positioned upon the upper edges of the body 2 and to extend the full length thereof, that is, from the wind-shield 5 to the rear of the vehicle, the upper and rear portions of the frames lying interiorly of the top 4 when the latter is in its extended position. Recesses 9 are provided in the frame for reception of the usual truss bars of the top. It is evident from this construction, that the usual open space formed between the body and the top will be completely occupied by the frames and, therefore, by their close relation with said vehicle parts, will effectively exclude the entrance of the weather. Cleats or strips 10 are secured to the vehicle and to the frames for rigidly retaining the latter in operative position and to prevent the rattling or vibrating of said frames.

In devices analogous to this invention considerable difficulty has been encountered in providing doors of a type to coöperate with the doors of the vehicle to permit the latter to be readily used. In a majority of devices it is necessary to dismount the usual doors of the vehicle and substitute a solid door of a design to fit both the vehicle and inclosing frame. With this object in view, the present invention provides a structure whereby the doors of the vehicle are left intact and coöperate with superposed doors upon the frames which do not interfere with the operation thereof. As shown, the frames 6 are formed with door receiving openings 11 and adapted to close said opening are doors 12, formed of two hinged sections 13 and 14. The section 13 is hinged as at 15 to the bars 16 of the frame 6, in order that when the doors are opened they will swing interiorly of the vehicle, said doors when folded lie against the sides of the frames to minimize the amount of space they occupy within the vehicle. Rubber buttons 17 are secured to the sides of the opening 11, opposite the point where the doors 12, are hinged, and are designed to exert a tension on the latter to assist in retaining them in an extended position and to reduce vibration of parts. Hand operated locking members 18 are pivoted to the frames and engage with the central portions of the doors 12 to prevent the accidental opening of the latter when closed. Flexible flaps 19, are also secured to the doors 12 between the sections 13 and 14, the flaps project inwardly and outwardly beyond the surfaces of doors to permit them to be conveniently grasped to open or close the latter.

It will thus be seen that there is provided a device in which the objects of this invention are achieved, and all of the advantageous features above mentioned, are, among others, present. The structure is efficient in operation, of few parts and simple construction. The doors 12 are so positioned that they can be readily operated from the vehicle operator's seat and will not interfere, when being opened, with the interior furnishings of the vehicle. The device consists primarily of a construction which can be readily attached to any standard form of vehicle without involving any changes or alterations in the design of the latter. It is, of course, understood that the design of the frame along its outer edges may be suitably shaped to conform to the construction of any vehicle body and a coöperating top, as such changes will necessarily have to be made to fit the device upon vehicles of different designs.

Having described the invention, what is claimed as new, is:—

An automobile body attachment comprising a pair of frames adapted to be rigidly positioned upon the opposed upper longitudinal edges of the car body, transparent panels in each frame, the latter also having door spaces alternately disposed with respect to said panels, a hinged door occupying each door space when in vertical alinement with one of the doors of the car, a yieldable element secured to the frame and adapted to be engaged by the door jamb to prevent rattling and to assist in maintaining the door in closed position, said door including hinged sections adapted to fold against the frame, and a pivoted latch element mounted upon the frame to bridge the joint between the hinged sections for holding said sections extended in position for use.

In testimony whereof I affix my signature.

B. FRANK BRACKBILL.